United States Patent [19]

Tune

[11] 3,998,507
[45] Dec. 21, 1976

[54] CLUTCH RELEASE MECHANISM

[75] Inventor: George Albert Tune, Ackworth, near Pontefract, England

[73] Assignee: Ransome Hoffmann Pollard Limited, England

[22] Filed: June 6, 1975

[21] Appl. No.: 584,527

[30] Foreign Application Priority Data

June 7, 1974 United Kingdom .......... 25379/74

[52] U.S. Cl. .................................. 308/233; 192/45
[51] Int. Cl.² ........................................ F16C 19/00
[58] Field of Search .................... 308/233; 192/45

[56] References Cited

UNITED STATES PATENTS

| | | | |
|---|---|---|---|
| 1,906,433 | 5/1933 | Sundahl | 308/233 |
| 2,785,023 | 3/1957 | Naumann | 308/233 |
| 3,390,927 | 7/1968 | Adams | 308/233 |
| 3,900,091 | 8/1975 | Maucher | 308/233 |
| 3,909,086 | 9/1975 | Keleshian | 308/233 |

Primary Examiner—Robert R. Song
Assistant Examiner—Richard A. Bertsch
Attorney, Agent, or Firm—Brisebois & Kruger

[57] ABSTRACT

A thrust bearing for the clutch release mechanism of a motor vehicle has a rotatable annular ring, a non-rotatable annular ring and a plurality of balls. The rings are capable of limited radial relative movement. One of the rings has a planar raceway and the other ring has a grooved raceway.

23 Claims, 8 Drawing Figures

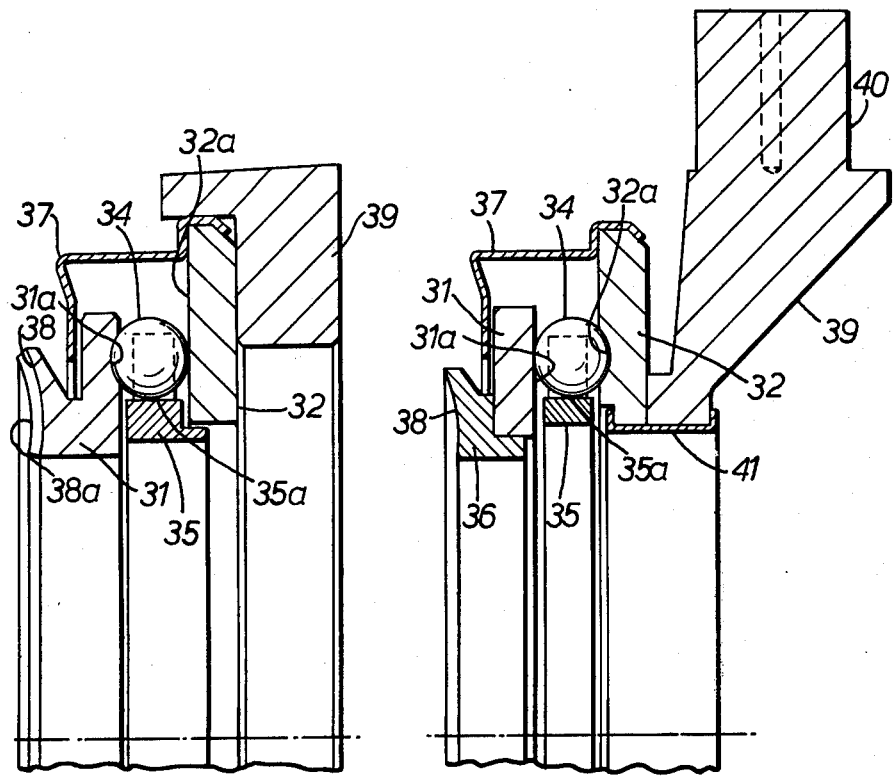
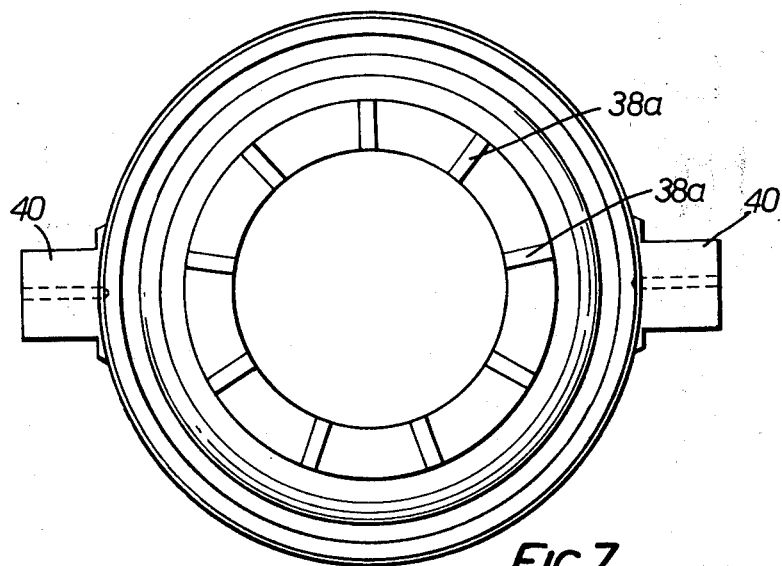

CLUTCH RELEASE MECHANISM

This invention relates to a thrust bearing for the clutch release mechanism of a motor vehicle clutch.

A conventional dry clutch for a motor vehicle consists of driving members attached to, and rotating with, the engine, driven members attached to, and rotating with, the transmission and operating members which connect and disconnect the driving members to and from the driven members. The operating members include springs and friction plates which frictionally couple the driving and driven members together, a rolling element thrust bearing and a release mechanism. Clutch release is effected by a pivoted, non-rotatable yoke which actuates the thrust bearing. One of the rings of the bearing is attached to a hub which is slidable on a sleeve fixed to the gearbox cover or, in some cases, is slidable on the clutch shaft itself. The other ring of the bearing engages directly the clutch diaphragm for disengaging the clutch. Alternatively, the other bearing ring acts against a thrust pad mounted on a lever system which operates the clutch pressure plate.

This form of clutch release mechanism is a direct descendant of the old-fashioned mechanism which utilises a plain carbon bearing. Here, an annulus of carbon is shrunk-fit into a metal casting which forms part of the clutch release lever fork. The metal casting acts as a carrier and also has means upon which acts a release lever yoke assembly pivoted within the vehicle clutch housing and actuated by means external to the vehicle clutch housing. During clutch disengagement one face of the carbon ring is forced into contact with a metal thrust pad attached either to the clutch release levers of a coil spring type clutch or to the diaphragm of a diaphragm type clutch. The non-rotating carbon ring acts as a plain unlubricated thrust bearing which is brought into contact with the rotating metal thrust pad, to disengage the clutch, for the duration of the gear change cycle only.

The main disadvantage of this mechanism incorporating a carbon bearing is that it has limited bearing capacity at speed. Moreover, to prevent excessive wear, it is essential to maintain a clearance between the carbon ring and the metal thrust pad (or the diaphragm) to prevent continuous friction between the contacting surfaces when the clutch is disengaged and the vehicle is being driven. The necessity for this clearance results in the need for regular adjustment of such a clutch, which is undesirable.

Although the replacement of such a carbon bearing by an anti-friction rolling-element bearing increases the bearing capacity at speed and permits constant contact with the thrust pad or diaphragm, it does introduce disadvantages arising from any misalignments in the clutch assembly. Thus, owing to the accumulation of tolerances between various parts of the clutch assembly, the axis of the release bearing can be offset with respect to the axis of the clutch itself. A variable amount of offset can also be introduced if the yoke which actuates the bearing is not correctly positioned, or of such a geometry as to cause the bearing to move in a non-rectalinear manner during the clutch release stroke. Any such offset induces a net side loading at the interface between the bearing and the thrust pad or diaphragm, the magnitude of which side loading is dependent upon the coefficient of friction at this interface. This side loading results in wear and heat generation at this interface and, more importantly, is imposed upon the clutch components themselves, which results in undesirable wear and variation of the load deflection characteristics of the clutch. This is particularly undesirable in the diaphragm spring type of clutch where wear of the fulcrum pivot of the diaphragm spring changes the deflection characteristics of the diaphragm and so affects operation of the clutch.

This side loading at the interface between the bearing and the thrust pad is negligible in a clutch assembly incorporating a carbon bearing because it is released by the sliding between the carbon bearing and the thrust pad. Consequently, reduction of the side loading in a clutch assembly incorporating a rolling-element bearing is possible by introducing a layer of low-friction material between the contact faces of the bearing and the thrust pad. Although this does reduce side loading, it does not eliminate it entirely and so still leads to wear of the clutch and to a substandard clutch performance.

Efforts have been made to overcome these misalignment problems by using a thrust bearing having a pair of rings with planar raceways and a plurality of needle rollers. Unfortunately, such bearings are not very practical as the needle rollers need to be located by a cage which rotates with the rollers and is supported by one of the bearing rings. This leads to friction between the cage and the supporting bearing ring and so to wear of the bearing. Moreover, as the inner and outer rings of such a bearing necessarily move at different speeds, it is not possible for rollers to have a pure rolling action. Consequently, the rollers have a combined rolling and slipping movement and this leads to further friction between the rollers and the cage pockets and so to further bearing wear.

The present invention provides a thrust bearing for the clutch release mechanism of a motor vehicle clutch, the bearing comprising a rotatable annular ring, a non-rotatable annular ring and a plurality of balls, the rings being capable of limited radial relative movement, wherein one of the rings has a planar raceway and the other ring has a grooved raceway.

Thus, where the axis of the bearing is offset from that of the clutch, the ring which contacts the clutch-disengaging mechanism (the thrust pad or the diaphragm), that is to say the rotatable ring, can move radially relative to the other (non-rotatable) ring of the bearing and so can rotate with the clutch-disengaging mechanism about the same axis, it being immaterial in such a case that the axis of the non-rotatable ring is offset from this axis of rotation (the axis of the clutch). Moreover, as one of the rings has a grooved raceway and balls are used as the rolling elements, the cage locating and separating the balls can float freely within the bearing without any special support means (the cage and the balls being centralised by the grooved raceway). Surprisingly, it has been found that, despite the small area of contact between the balls and the planar raceway, balls are capable of transmitting the loads applied to the bearing. Up to now, it has been considered impracticable to utilise balls with planar raceways because of the belief that balls would not be able to transmit the required load.

Preferably, the non-rotatable ring has a planar raceway and the rotatable ring has a grooved raceway. This facilitates the location of the balls in the bearing and provides control of the orbital path of the balls, this path being a circle whose centre lies on the axis of the clutch. Where the relative displacement of the rings is very small, and the cage or ball separator construction allows sufficient ball pocket elongation in the circumferential plane to cater for the variation of ball orbital speed, the rotatable ring may have a planar raceway and the non-rotatable ring a grooved raceway.

The non-rotatable ring may also be provided with a shroud having a substantially cylindrical portion, which overlies the rotatable ring and the balls, and an inwardly extending annular flange. The shroud constitutes a shield preventing the ingress of foreign particles into the bearing. Alternatively, for small bearings and bearings used for low and medium speed applications, the rotatable ring may be provided with a shroud having a substantially cylindrical portion, which overlies the non-rotatable ring and the balls, and an inwardly extending flange. For high speed applications this alternative shroud mounting would not be suitable as it would rotate with the rotatable ring and would centrifuge the grease contained in the bearing so that the base oil would be separated from the grease structure which would lead to lubrication failure and hence to wear of the bearing.

In either case, the shroud may be made of pressed steel, in which case it is press-fitted or swaged to its ring, or it may be an injection moulded plastics shroud which is fixed to its ring by snap-fitting.

Preferably, the rotatable ring is provided with a member which contacts a clutch-disengaging mechanism of the clutch. Said member may be formed integrally with the rotatable ring. Alternatively, an adaptor, press-fitted to the rotatable ring, may constitute said member.

Advantageously, the clutch-contacting face of said member is shaped to complement the shape of the contacted part of the clutch-disengaging mechanism. This is particularly advantageous when the bearing is used in conjunction with a diaphragm clutch as the bearing contacts directly the diaphragm spring itself. Two general patterns of diaphragm spring are in common use, namely a plain conical dished diaphragm and a conical dished diaphragm whose inner ends are convexed. With the former type of diaphragm, it is preferable, therefore, for the clutch-contacting face of said member to be convex, whereas with the latter type of diaphragm the clutch-contacting face of said member should be concave.

Bearings with clutch-contacting faces of these forms are sufficiently stable in the lower speed range. However, at high engine speeds the centrifugal forces, developed as a result of even the slightest ring offset or non-concentricity present at low contact loading, are cumulative and require a higher bearing to clutch contact preload to maintain the rotatable ring concentric with the clutch. Such high preloads are undesirable unless catered for in the initial clutch bearing design. For high speeds, therefore, the clutch-contacting member may be provided with a plurality of projections which, in use, engage in slots provided in the contacted part of the clutch-disengaging mechanism. Such an arrangement is particularly useful where a diaphragm clutch is used, as slots are provided in the inner part of the diaphragm to give a lever action for flexing the Belleville washer section at the outer edge of the diaphragm. The engagement of the projections directly with the diaphragm acts to locate the rotatable ring in a positive manner in any radial direction and so prevents any progressive displacement of the rotatable ring. It also prevents development of additional centrifugal forces which otherwise would tend towards cumulative ring displacement with increasing engine speed.

This interlocking of the projections with the diaphragm in addition to controlling the displacement of the rotatable ring also reduces the axial preload required to control the bearing concentric to the diaphragm throughout the safe speed range of the clutch/bearing assembly. Moreover, this interlocking produces a torsional drive independent of contact friction and so prevents circumferential skidding at the contact interfaces which might otherwise arise owing to bearing inertia drag. This torsional drive also overcomes the frictional torque produced at the contact interfaces by sudden bursts of engine acceleration and so eliminates an additional source of heat generation and wear.

The initial engagement of the projections with the slots is facilitated if the projections are shaped to complement the shape of the engaged part of the clutch-disengaging mechanism.

The invention also provides a clutch release mechanism comprising a thrust bearing as defined above, a clutch-actuating device and a clutch-disengaging mechanism, the rotatable ring being engagable with the clutch disengaging mechanism and the non-rotatable ring being engagable with the clutch-actuating device.

Preferably, the non-rotatable ring of the thrust bearing is supported by a carrier. Advantageously, the carrier is provided with a pair of diametrically opposed trunnions which are engaged by a release lever yoke constituting part of the clutch-actuating device.

The non-rotatable ring may be held to the carrier by means of a spring clip made of spring steel or plastics material. This method of retaining the bearing is considerably cheaper than preparing press-fit surfaces as is necessary with known bearings. It also facilitates the assembly, or dis-assembly, of the clutch release mechanism without damage to the bearing parts.

The invention further provides a motor vehicle clutch including a clutch release mechanism as defined above.

Six forms of thrust bearing for incorporation in the clutch release mechanism of a motor vehicle clutch and constructed in accordance with the invention will now be described, by way of example, with reference to the accompanying drawings, in which:

FIG. 6 is a part-sectional elevation of part of the fifth form of bearing;

FIG. 7 is an end view of the bearing of FIG. 6; and

FIG. 8 is a part-sectional elevation of the sixth form of bearing.

Figure 1:
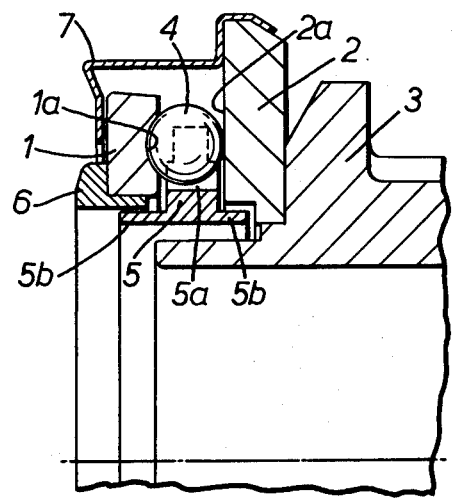
FIG. 1 is a part-sectional elevation of part of the first form of bearing.

Referring to the drawings, FIG. 1 shows a clutch release bearing having a rotatable ring 1, a non-rotatable ring 2 fast to a hub 3, a plurality of balls 4 (only one of which can be seen) and a cage 5. The hub 3 is axially slidable and is actuable by the normal foot pedal (not shown) via a hydraulic system (not shown) and a mechanical linkage (not shown). An adaptor 6 made of pressed steel and press-fitted to the ring 1 contacts the diaphragm (not shown) of a motor vehicle clutch. Both rings 1 and 2 are made from high quality bearing steel.

The ring 1 defines a planar raceway 1a whereas the ring 2 is provided with a raceway groove 2a. The cage 5 is provided with a plurality of equispaced pockets 5a each of which accommodates a ball 4. A pressed steel shroud 7 swaged to the outer diameter of the ring 2 overlies the ring 1 and the balls 4, and constitutes a shield to retain the bearing lubricant and to prevent the ingress of foreign particles into the bearing. A separate grease seal (not shown) helps to prevent the loss of lubricant.

The hub and bearing assembly are mounted on a sleeve (not shown) which is fixed to the gear box cover, the hub 3 being coupled to a clutch release lever yoke (not shown). The assembly is initially adjusted so that the left hand end (as seen in FIG. 1) of the adaptor 6 abutts the diaphragm under a light axial pre-load. Thus, in use, the adaptor 6 of the rotatable ring 1 permanently contacts the diaphragm and so the ring 1 rotates with the diaphragm whether or not the clutch is engaged. The grooved raceway 1a centralises the balls 4 and the cage 5 so that there is no need for the cage to be provided with support means. The diaphragm-contacting face of the adaptor 6 is convex and so matches the shape of the plain conical dished type of diaphragm.

To disengage the clutch, the hub 3 is moved to the left as seen in FIG. 1 by the release lever yoke. This hub movement carries the bearing and the adaptor 6 with it and causes the inner part of the diaphragm to move to the left, which flexes the outer part to the right to disengage the clutch. If the axis of the hub 3 is offset from the axis of the clutch, the ring 1 takes up a position radially offset from the axis of the ring 2 and so rotates with the diaphragm about the same axis. In such an offset position, the balls 4 make point rolling contact with the raceway 2a, the balls tracing an elliptical path on the raceway 2a. Depending on the degree of offset, the balls will contact the raceway 1a at different points. Thus, even where offset occurs there is virtually no side loading on the interface between the diaphragm and the rotatable ring 1 of the bearing.

The bearing can also be set up without the initial axial pre-load. In this case, the adaptor 6 of the rotatable ring 1 engages the diaphragm only when the clutch is disengaged. Thus, the grooved raceway 1a centralises the balls 4 and the cage 5 only when the clutch is disengaged. When the clutch is engaged the cage 5, together with the balls 4 and the rotatable ring 1 are supported on a fixed part of the bearing by means of shoulders 5b provided on the cage.

Figure 2:
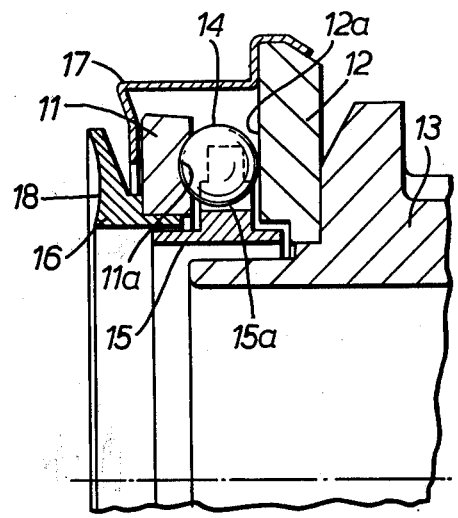
FIG. 2 is a part-sectional elevation of part of the second form of bearing.

FIG. 2 shows a modified form of clutch release bearing having a rotatable ring 11, a non-rotatable ring 12 fast to a hub 13, a plurality of balls 14 (only one of which can be seen) and a cage 15. The hub 13 is axially slidable and is actuable in the same manner as the hub 3 of the embodiment of FIG. 1. An adaptor 16 made of pressed steel and press-fitted to the ring 11 contacts the diaphragm (not shown) of a motor vehicle clutch. Both the rings 11 and 12 are made from high quality bearing steel.

The ring 11 defines a planar raceway 11a, the ring 12 is provided with a raceway groove 12a and the cage 15 is formed with a plurality of equispaced pockets 15a each of which accommodates a ball 14. A pressed metal shroud 17 swaged to the outer diameter of the ring 12 overlies the ring 11 and the balls 14 and constitutes a shield to prevent the ingress of foreign particles into the bearing, the shroud also forming together with the ring 11 a labyrinth for preventing grease loss. A separate grease seal (not shown) helps to prevent the loss of grease. The diaphragm-contacting face of the adaptor 16 is concave so that this bearing is particularly suitable for use with the type of diaphragm having a conical dish whose inner ends are convexed.

The clutch is disengaged in a similar manner to that in which the clutch referred to in the FIG. 1 embodiment is disengaged. Here again, the bearing can be set up so that the adaptor bears against the diaphragm with an initial pre-load so that the ring 11 always rotates with the diaphragm. Alternatively, the bearing can be set up with no initial pre-load, in which case the ring 11 only rotates with the diaphragm when the clutch is disengaged.

Figure 3:
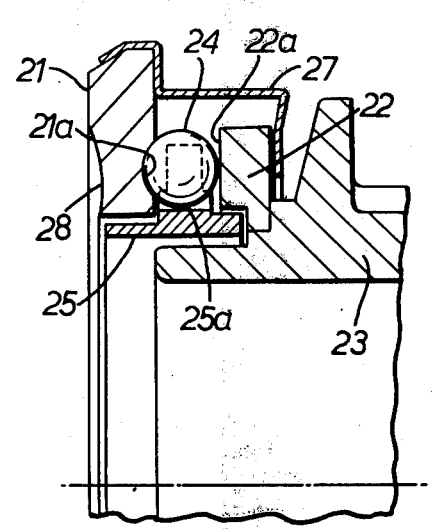
FIG. 3 is a part-sectional elevation of part of the third form of bearing.

The clutch release bearing shown in FIG. 3 is very similar to those shown in FIGS. 1 and 2 in that it has a rotatable ring 21 having a grooved raceway 21a, a non-rotatable ring 22 having a planar raceway 22a, a hub 23, a plurality of balls 24, a cage 25 having pockets 25a and a shroud 27. Here, however, the shroud 27 is swaged to the outer diameter of the rotatable ring 21. This arrangement is suitable only for low and medium speed applications as, at high speeds, the rotation of the shroud 27 would tend to centrifuge the grease within the bearing and so would tend to break down the grease into its constituent parts which would lead to premature bearing failure. The bearing of this embodiment has, however, no adaptor equivalent to adaptors 6 and 26 of FIGS. 1 and 2. Instead the left hand (as seen in FIG. 3) end of the rotatable ring 21 is formed with a convex diaphragm-contacting portion 28.

Disengagement of the clutch associated with this bearing is effected in a similar manner to those described above with reference to FIGS. 1 and 2.

Figure 4:
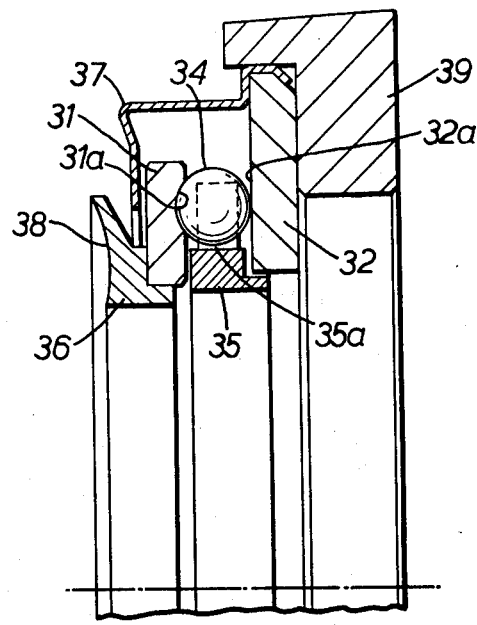
FIG. 4 is a part-sectional elevation of part of the fourth form of bearing.
Figure 5:
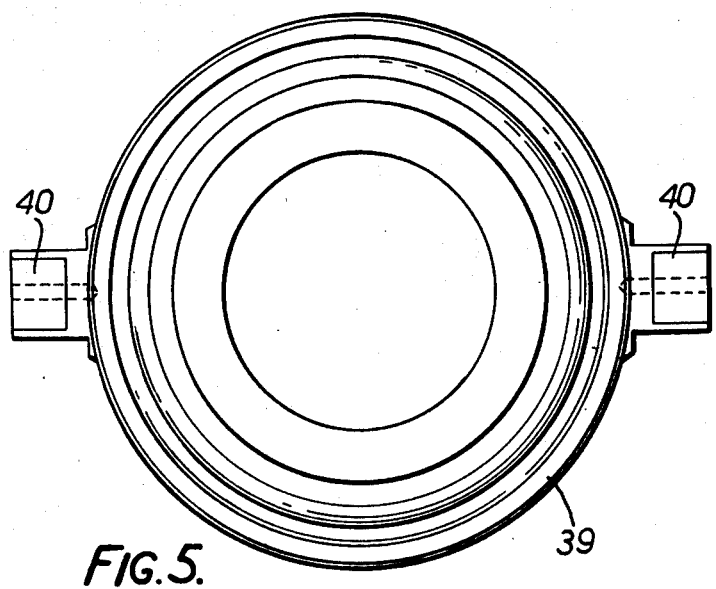
FIG. 5 is an end view of the bearing of FIG. 4.

The clutch release bearing shown in FIGS. 4 and 5 is generally similar to those of FIGS. 1 to 3. Thus, it has a rotatable ring 31 provided with a grooved raceway 31a, a nonrotatable ring 32 provided with a planar raceway 32a, a plurality of balls 34, a cage 35 having pockets 35a, an adaptor 36 pressfitted to the ring 31 and a shroud 37 swaged to the outer diameter of the ring 32. Here again, the adaptor 36 is formed with a concave diaphragm-contacting portion 38.

In this embodiment, there is no hub equivalent to hubs 3, 13 and 23 of the earlier embodiments. In its place, the non-rotatable ring 32 is supported by a carrier 39 and the complete bearing and carrier are semi-freely supported on the clutch release lever yoke (not shown) by means of a pair of diametrically opposed trunnions 40 (see FIG. 5). The release lever yoke is provided with seatings cooperating with the trunnions 40 and the yoke straddles the transmission shaft and is pivoted within the clutch housing. A peculiarity of this mounting arrangement is that the bearing, in addition to being displaced axially to the left (as seen in FIG. 4) to disengage the clutch, traverses part of a circular arc, owing to it being mounted on the pivoted release lever. This ordinarily accentuates alignment problems but, in this arrangement the problem does not arise because of the relative movement between the rings 31 and 32. Nevertheless, the bearing of this embodiment has to be designed to take up substantially more radial offset than has the bearings of FIGS. 1 to 3.

FIGS. 6 and 7 show a bearing which is practically identical with that shown in FIGS. 4 and 5. Accordingly, the like reference numerals have been used in these figures for like parts and, for the sake of brevity, this bearing will not be described in detail. The only difference between the bearings of FIGS. 6 and 7 and of FIGS. 4 and 5, is that the adaptor 36 of the bearing of FIGS. 6 and 7 is provided with a plurality of equispaced, axially extending projections 38a on its diaphragm contacting face 38. These projections 38a mate with slots (not shown) formed in the inner part of the diaphragm. The projections 38a are profiled in a similar manner as the face 38 (that is to say they are concave towards the diaphragm) so that as the bearing approaches the clutch during assembly, the concave faces of the projections 38a contact the diaphragm which tends to lift the bearing to a central position, from which a slight angular rotation is required to allow the projections to drop into engagement with the slots. The location of the projections 38a in the diaphragm slots not only locates the rotatable ring 31 positively in any radial direction and so prevents any progressive displacement of this ring, but also prevents the development of additional centrifugal forces which, at high engine speeds, would tend towards cumulative displacement of the ring 31. This interlocking also reduces the axial pre-load required to control the bearing concentric to the diaphragm throughout the required speed range. Moreover, it produces a torsional drive independent of contact friction and so prevents circumferential skidding at the contact surfaces which might otherwise arise owing to bearing inertia drag. Furthermore, this torsional drive overcomes the frictional torque produced at the contact interfaces by sudden bursts of engine acceleration and so eliminates an additional source of heat generation and wear. This form of bearing can, obviously, only be used with the rotatable ring 31 permanently linked for rotation with the diaphragm.

FIG. 8 again shows a bearing similar to that of FIGS. 4 and 5 and here again like reference numerals are used for like parts. The carrier 39 of this embodiment is, however, of different form to that of FIGS. 4 and 5 and the non-rotatable ring 32 is fastened to this carrier by a spring clip 41 made of spring steel. This method of retaining the bearing is considerably cheaper than preparing press-fit surfaces. It also facilitates assembly, or dis-assembly, of the clutch release mechanism without damage to the bearing parts. The only other difference between this bearing and the bearing of FIGS. 4 and 5 is that the rotatable ring 31 of the FIG. 8 bearing has a planar raceway 31a and the nonrotatable ring 32 has a grooved raceway 31a.

Bearing rings and adaptors with both diaphragm-contacting faces and projections can be produced by various means. Where a separate adaptor is used, it can be formed with the special face (and the projections) from cast sintered metal or be made of pressed steel. Alternatively, the special face and projections can be formed on the ring itself by forging or "wobble" forging.

The clutch release bearings described above could be modified in a number of ways. Thus, instead of utilising a single direction ball thrust type of bearing, an angular contact bearing could be used.

Moreover, although each of the bearings described above is intended for use with a diaphragm clutch, it will be apparent that these bearings could be modified for use with clutches incorporating the thrust pad/lever system type of release mechanism.

What we claim is:

1. A thrust bearing for the clutch release mechanism of a motor vehicle clutch, the bearing comprising a rotatable annular ring, a non-rotatable annular ring and a plurality of balls, said rings being axially spaced and capable of limited radial relative movement, wherein one of said rings has a planar raceway and said other ring has a grooved raceway.

2. A thrust bearing as claimed in claim 1, wherein said rotatable ring has a planar raceway and said non-rotatable ring has a grooved raceway.

3. A thrust bearing as claimed in claim 1, wherein said non-rotatable ring has a planar raceway and said rotatable ring has a grooved raceway.

4. A thrust bearing as claimed in claim 1, wherein said non-rotatable ring is provided with a shroud having a substantially cylindrical portion, which overlies said rotatable ring and said balls, and an inwardly extending annular flange.

5. A thrust bearing as claimed in claim 4, wherein said shroud is made of pressed steel and is fixed to its ring by press-fitting or swaging.

6. A thrust bearing as claimed in claim 4, wherein said shroud is an injection moulded plastics shroud and is fixed to its ring by snap fitting.

7. A thrust bearing as claimed in claim 1, wherein said rotatable ring is provided with a shroud having a cylindrical portion, which overlies said non-rotatable ring and said balls, and an inwardly extending annular flange.

8. A thrust bearing as claimed in claim 7, wherein said shroud is made of pressed steel and is fixed to its ring by pressfitting or swaging.

9. A thrust bearing as claimed in claim 7, wherein said shroud is an injection moulded plastics shroud and is fixed to its ring by snap fitting.

10. A thrust bearing as claimed in claim 1, wherein a grease seal is provided for retaining grease within the bearing.

11. A thrust bearing as claimed in claim 1 wherein the rotatable ring is provided with a member which contacts a clutch-disengaging mechanism of the clutch.

12. A thrust bearing as claimed in claim 11, wherein said member is formed integrally with said rotatable ring.

13. A thrust bearing as claimed in claim 11, wherein an adaptor, press fitted to said rotatable ring, constitutes said member.

14. A thrust bearing as claimed in any claim 11, wherein the clutch-contacting face of said member is shaped to complement the shape of the contacted part of the clutch-disengaging mechanism.

15. A thrust bearing as claimed in claim 14, wherein said clutch-contacting face of said member is convex.

16. A thrust bearing as claimed in claim 14, wherein said clutch-contacting face of said member is concave.

17. A thrust bearing as claimed in claim 11, wherein said clutch-contacting member is provided with a plurality of projections which, in use, engage in slots provided in the contacted part of the clutch-disengaging mechanism.

18. A thrust bearing as claimed in claim 17, wherein said projections are shaped to complement the shape of the engaged part of the clutch-disengaging mechanism.

19. A clutch release mechanism comprising a thrust bearing as claimed in claim 1, a clutch actuating device and a clutch-disengaging mechanism, said rotatable ring being engagable with clutch-disengaging mechanism and said nonrotatable ring being engagable with the clutch-actuating device.

20. A clutch release mechanism as claimed in claim 19, wherein said non-rotatable ring of the thrust bearing is supported by a carrier.

21. A clutch release mechanism as claimed in claim 20, wherein said carrier is provided with a pair of diametrically opposed trunnions which are engaged by a release lever yoke constituting part of the clutch-actuating device.

22. A clutch release mechanism as claimed in claim 20, wherein said non-rotatable ring is held to the carrier by means of a spring clip.

23. A motor vehicle clutch which includes a clutch release mechanism as claimed in claim 19.

* * * * *